US008864065B2

(12) United States Patent
Koehler et al.

(10) Patent No.: US 8,864,065 B2
(45) Date of Patent: Oct. 21, 2014

(54) CHORD-EXPANDING AIR VEHICLE WINGS

(71) Applicant: Raytheon Company, Watlham, MA (US)

(72) Inventors: Frederick B Koehler, Tucson, AZ (US);
Terry M Sanderson, Tucson, AZ (US);
Jack W Reany, Corona de Tucson, AZ (US)

(73) Assignee: Raytheon Company, Waltham, MA (US)

( * ) Notice: Subject to any disclaimer, the term of this patent is extended or adjusted under 35 U.S.C. 154(b) by 8 days.

(21) Appl. No.: 13/660,209

(22) Filed: Oct. 25, 2012

(65) Prior Publication Data

US 2013/0200208 A1  Aug. 8, 2013

Related U.S. Application Data

(60) Provisional application No. 61/555,536, filed on Nov. 4, 2011.

(51) Int. Cl.
*B64C 3/56* (2006.01)
*F42B 10/14* (2006.01)

(52) U.S. Cl.
CPC .. *B64C 3/56* (2013.01); *F42B 10/14* (2013.01)
USPC ................................ 244/49; 244/218; 244/46

(58) Field of Classification Search
USPC .......................... 244/3.27, 218, 49, 46, 172.6
See application file for complete search history.

(56) References Cited

U.S. PATENT DOCUMENTS

| 1,653,903 | A | * | 12/1927 | Hall | 244/218 |
| 1,742,910 | A | * | 1/1930 | Grinoch et al. | 244/218 |
| 2,075,788 | A | * | 4/1937 | Adams | 244/218 |
| 2,559,827 | A | | 7/1951 | Northrop | |
| 3,285,540 | A | * | 11/1966 | Lee | 244/218 |
| 3,628,352 | A | | 12/1971 | Stuemky | |
| 3,666,210 | A | * | 5/1972 | Look et al. | 244/218 |

(Continued)

FOREIGN PATENT DOCUMENTS

| CN | 101028866 A | 9/2007 |
| EP | 0361418 A2 | 4/1990 |

(Continued)

OTHER PUBLICATIONS

Thill C. et al., "Morphing Skins", Aeronautical Journal, (2008), vol. 112, No. 1129, [retrieved from Internet], <www.aer.bris.ac.uk/research/fibres/morph%20pics/RoyAeroSocMorphSkin.pdf>.

(Continued)

*Primary Examiner* — Philip J Bonzell
(74) *Attorney, Agent, or Firm* — Renner, Otto, Boisselle & Sklar, LLP

(57) ABSTRACT

An air vehicle wing includes foldable ribs coupled to a leading-edge spar. The ribs each have multiple rib segments which are foldable (hinged) relative to each other. Extension linkages, each with multiple extension linkage segments, pass through openings in the rib segments, and may be coupled to the rib segments with pin couplings, able to change relative angle between the individual rib segments and the extension linkage segments to which they are coupled. A skin may cover the ribs, to provide an outer surface of the wing that may be unfolded as the wing is expanded from a stowed, small-chord condition, to a deployed, large-chord condition.

15 Claims, 5 Drawing Sheets

(56) References Cited

U.S. PATENT DOCUMENTS

| | | | |
|---|---|---|---|
| 4,090,684 A * | 5/1978 | Look et al. | 244/218 |
| 4,106,727 A * | 8/1978 | Ortell | 244/49 |
| 4,176,411 A | 12/1979 | Runge | |
| 5,049,591 A | 9/1991 | Hayashi et al. | |
| 5,082,207 A | 1/1992 | Tulinius | |
| 5,181,678 A | 1/1993 | Widnall et al. | |
| 5,662,294 A | 9/1997 | Maclean et al. | |
| 5,988,689 A | 11/1999 | Lever | |
| 6,010,098 A | 1/2000 | Campanile et al. | |
| 6,073,882 A * | 6/2000 | Zieger | 244/49 |
| 6,264,136 B1 | 7/2001 | Weston | |
| 6,308,628 B1 | 10/2001 | Bronstein et al. | |
| 6,628,040 B2 | 9/2003 | Pelrine et al. | |
| 6,705,568 B2 | 3/2004 | Lee | |
| 6,834,835 B1 | 12/2004 | Knowles et al. | |
| 6,905,093 B2 | 6/2005 | Dryer et al. | |
| 7,066,428 B1 | 6/2006 | Haggard et al. | |
| 7,306,187 B2 | 12/2007 | Lavan | |
| 7,699,834 B2 | 4/2010 | Hood et al. | |
| 7,728,267 B2 | 6/2010 | Sanderson et al. | |
| 7,762,500 B1 * | 7/2010 | Dhall | 244/218 |
| 7,777,165 B2 | 8/2010 | Sanderson et al. | |
| 7,854,410 B2 | 12/2010 | Fanucci et al. | |
| 7,931,240 B2 | 4/2011 | Kothera et al. | |
| 7,939,178 B2 | 5/2011 | Sar et al. | |
| 8,016,249 B2 | 9/2011 | Sar et al. | |
| 8,056,853 B2 | 11/2011 | Eisentraut et al. | |
| 8,262,032 B2 | 9/2012 | Sanderson et al. | |
| 8,376,279 B2 * | 2/2013 | Parks et al. | 244/123.11 |
| 8,439,314 B1 * | 5/2013 | Dhall | 244/218 |
| 8,584,984 B2 * | 11/2013 | Parks et al. | 244/49 |
| 2002/0195177 A1 | 12/2002 | Hinkley et al. | |
| 2003/0036090 A1 | 2/2003 | Patil et al. | |
| 2004/0086699 A1 | 5/2004 | Schneider | |
| 2005/0157893 A1 | 7/2005 | Pelrine et al. | |
| 2005/0206096 A1 | 9/2005 | Browne et al. | |
| 2006/0118675 A1 * | 6/2006 | Tidwell | 244/123.1 |
| 2006/0144992 A1 * | 7/2006 | Jha et al. | 244/46 |
| 2006/0163423 A1 | 7/2006 | Parine et al. | |
| 2006/0192465 A1 | 8/2006 | Kornbluh et al. | |
| 2007/0107189 A1 | 5/2007 | Prichard et al. | |
| 2008/0061192 A1 | 3/2008 | Sullivan | |
| 2009/0072094 A1 | 3/2009 | Sanderson et al. | |
| 2009/0184207 A1 * | 7/2009 | Warren et al. | 244/172.6 |
| 2009/0206192 A1 | 8/2009 | Sanderson et al. | |
| 2009/0206196 A1 * | 8/2009 | Parks et al. | 244/49 |
| 2009/0283643 A1 | 11/2009 | Sar et al. | |
| 2009/0283936 A1 | 11/2009 | Sanderson et al. | |
| 2009/0286101 A1 | 11/2009 | Sar et al. | |
| 2009/0302151 A1 | 12/2009 | Holmes | |
| 2010/0030308 A1 | 2/2010 | Anderson et al. | |
| 2010/0127130 A1 | 5/2010 | Eisentraut et al. | |
| 2010/0282917 A1 | 11/2010 | O'Shea | |
| 2010/0288870 A1 | 11/2010 | Geswender et al. | |

FOREIGN PATENT DOCUMENTS

| | | |
|---|---|---|
| EP | 0905019 A2 | 3/1999 |
| EP | 1607603 A2 | 12/2005 |
| GB | 2445099 A | 6/2008 |
| JP | 60145385 A | 7/1985 |
| JP | 2009047179 A | 3/2009 |
| WO | 9308013 A1 | 4/1993 |
| WO | 9324300 A1 | 12/1993 |
| WO | 03068584 A1 | 8/2003 |
| WO | 2007001392 A2 | 1/2007 |
| WO | 2008068472 A1 | 6/2008 |

OTHER PUBLICATIONS

Sanderson, Terry "Shape Memory Polymer Characterization for Advanced Air Vehicle Technologies", Raytheon Technology Today, (2007), vol. 2007, No. 4, [retrieved from internet] <www.raytheon.com/technology_today/archive/2007_issue 4.pdf>.

Shaw, John A. et al., "The Manufacture of Niti Foams", Proceedings of 2002 ASME International Mechanical Engineering Congress and Exposition, (2002), pp. 1-10.

Perkins, David A. et al., "Morphing Wing Structures for Loitering Air Vehicles", 45th AIAA/ASME/ASCE/AHS/ASC Structures, Structural Dynamics & Materials Conference, (2004), pp. 1.

Zihlif, A.M., et al., Physical Characterization and Performance of Iron Polymer Composites, Wiley Online Library (wileyonlinelibrary.com), Jan. 2012.

International Search Report and the Written Opinion for corresponding International Application No. PCT/US2012/047834 mailed Oct. 11, 2012.

* cited by examiner

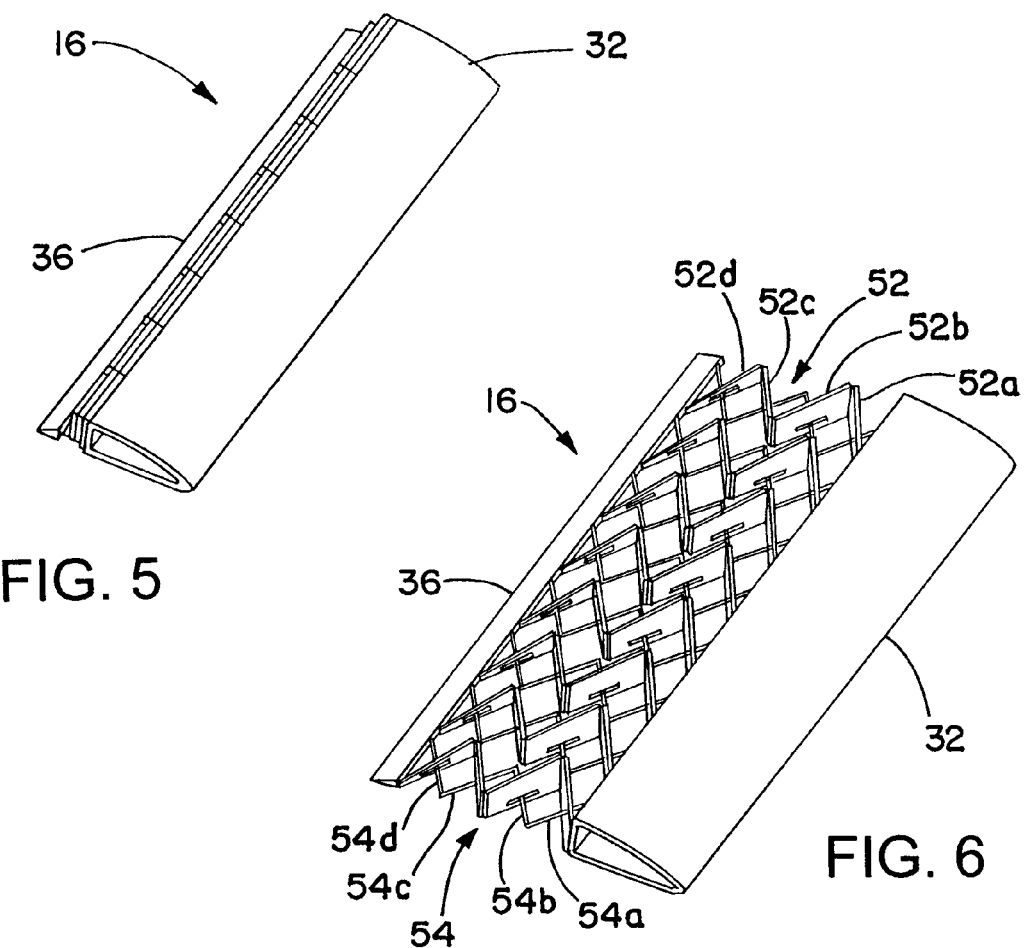
FIG. 5
FIG. 6
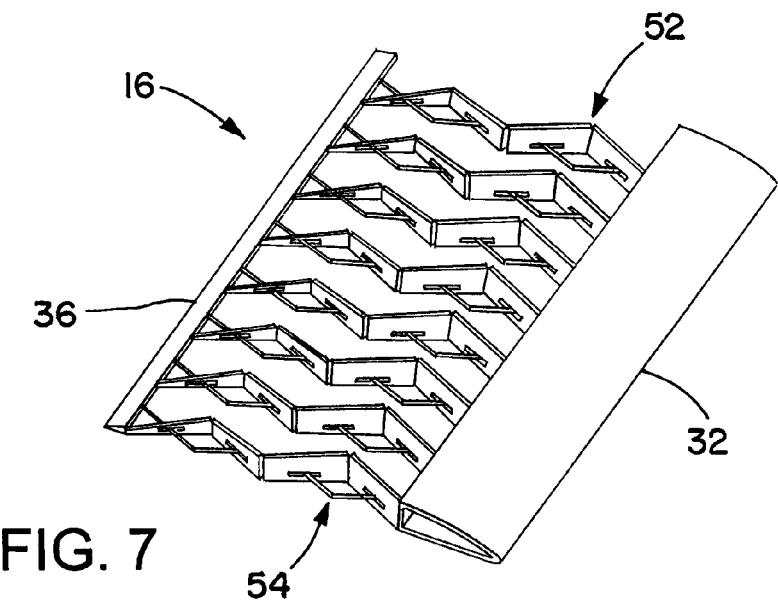
FIG. 7

CHORD-EXPANDING AIR VEHICLE WINGS

This application claims priority to U.S. Provisional Application 61/555,536, filed Nov. 4, 2011, which is incorporated herein by reference in its entirety.

BACKGROUND OF THE INVENTION

1. Field of the Invention

The invention is in the field of deployable wings, and in air vehicles having deployable wings.

2. Description of the Related Art

Air vehicles launched from tubes or other devices may be severely limited in wing size and/or configuration, because of the need for the wings to fit within the launcher envelope. This limitation on wings limits the performance of tube-launched or other deployable air vehicles. Improvement in deployable wings would therefore be desirable.

SUMMARY OF THE INVENTION

According to an aspect of the invention, an extendible-chord air vehicle wing includes: a leading-edge spar; and foldable ribs coupled to a back of the leading-edge spar. The leading-edge spar may be made of aluminum or a fiber reinforced plastic composite. The leading-edge spar may be hollow. The leading-edge spar may be a D-shape spar. Each of the ribs may include multiple rib segments hingedly coupled together. The wing may further include extension linkages mechanically coupled to the respective of the ribs. The extension linkages each may include multiple extension linkage segments hingedly coupled together. For each of the extension linkages, the linkage segments may pass through respective openings in the rib segments. The openings may be notches or holes. The linkages are slidingly may be coupled to the leading-edge spar. The air vehicle wing may further include a trailing-edge spar that is hingedly coupled to the foldable ribs. The air vehicle wing may further include a skin on an outside surface, covering the ribs. The skin may be a fabric skin. The wing may have a flat-bottomed (uncambered) airfoil shape.

According to another aspect of the invention, an air vehicle includes a fuselage; and extendible-chord wings as described in the previous paragraph, mechanically coupled to the fuselage. The air vehicle may be a missile, a projectile, or a glide bomb, and may be powered or unpowered. The air vehicle may be an unmanned aerial vehicle. The air vehicle may be deployable from a stowed configuration, with the air vehicle in the container, to a deployed configuration. The wings have a reduced chord in the stowed configuration, and an increased chord in the deployed configuration. The wings may be pivotally coupled to the fuselage. The air vehicle may further include fins coupled to the fuselage. The fins may deploy outward as the air vehicle deploys from the stowed state to the deployed state.

According to yet another aspect of the invention, a method of deploying the air vehicle as described in the previous paragraph includes increasing the chord of the wings. The increasing the chord may include increasing the chord by at least a factor of 2. The increasing the chord may include increasing the chord by at least a factor of 2.5. The increasing the chord may include increasing the chord by at least a factor of 3. The method may further include pivoting the wings relative to the fuselage. The method may further include unfolding skins of the wings as part of the process of increasing the chords of the wings.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 5 is an oblique view illustrating a first step in the extension of the wing of FIG. 3.

FIG. 6 is an oblique view illustrating a second step in the extension.

FIG. 7 is an oblique view illustrating a third step in the extension.

DETAILED DESCRIPTION

An air vehicle wing includes foldable ribs coupled to a leading-edge spar. The ribs each have multiple rib segments which are foldable (hinged) relative to each other. Extension linkages, each with multiple extension linkage segments, pass through openings in the rib segments, and may be coupled to the rib segments with pin couplings, able to change relative angle between the individual rib segments and the extension linkage segments to which they are coupled. A skin may cover the ribs, to provide an outer surface of the wing that may be unfolded as the wing is expanded from a stowed, small-chord condition, to a deployed, large-chord condition.

Figure 1A:
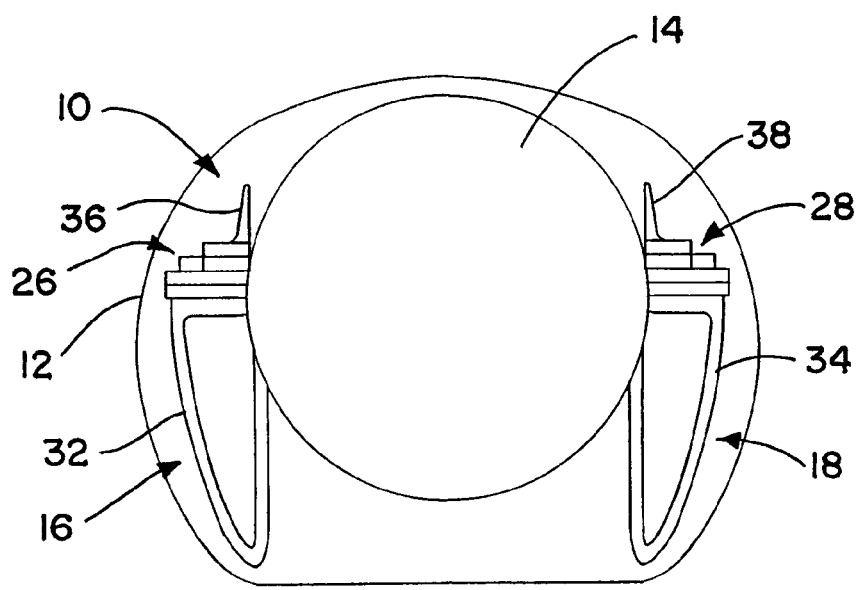
FIG. 1A is a cross section view of an air vehicle according to an embodiment of the invention, in a container.
Figure 1B:
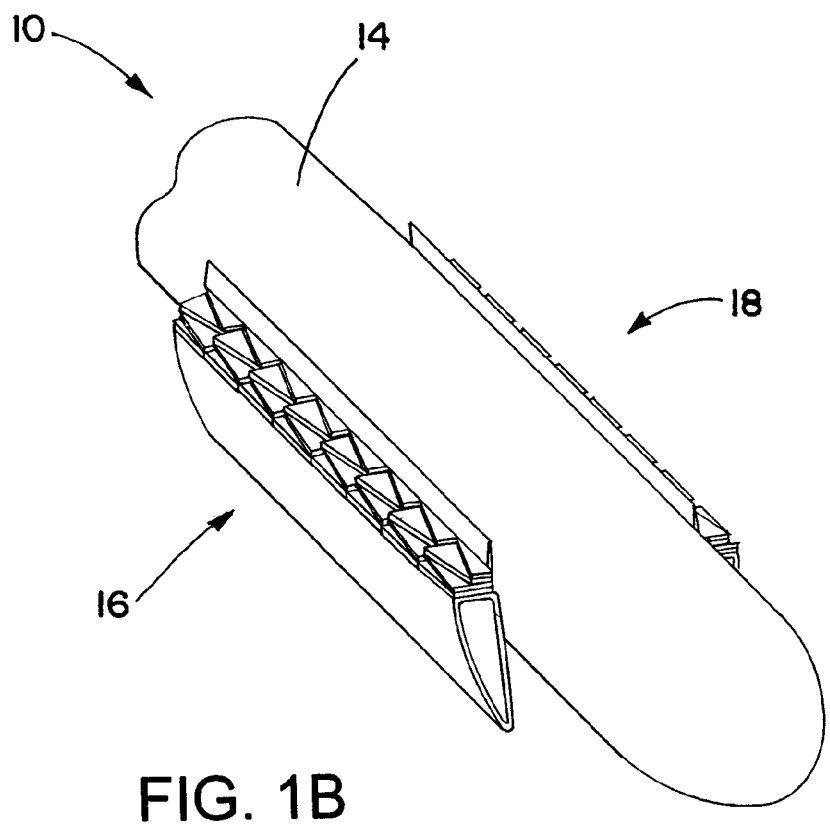
FIG. 1B is an oblique view of part of the air vehicle of FIG. 1A, with wings stowed.
Figure 2:
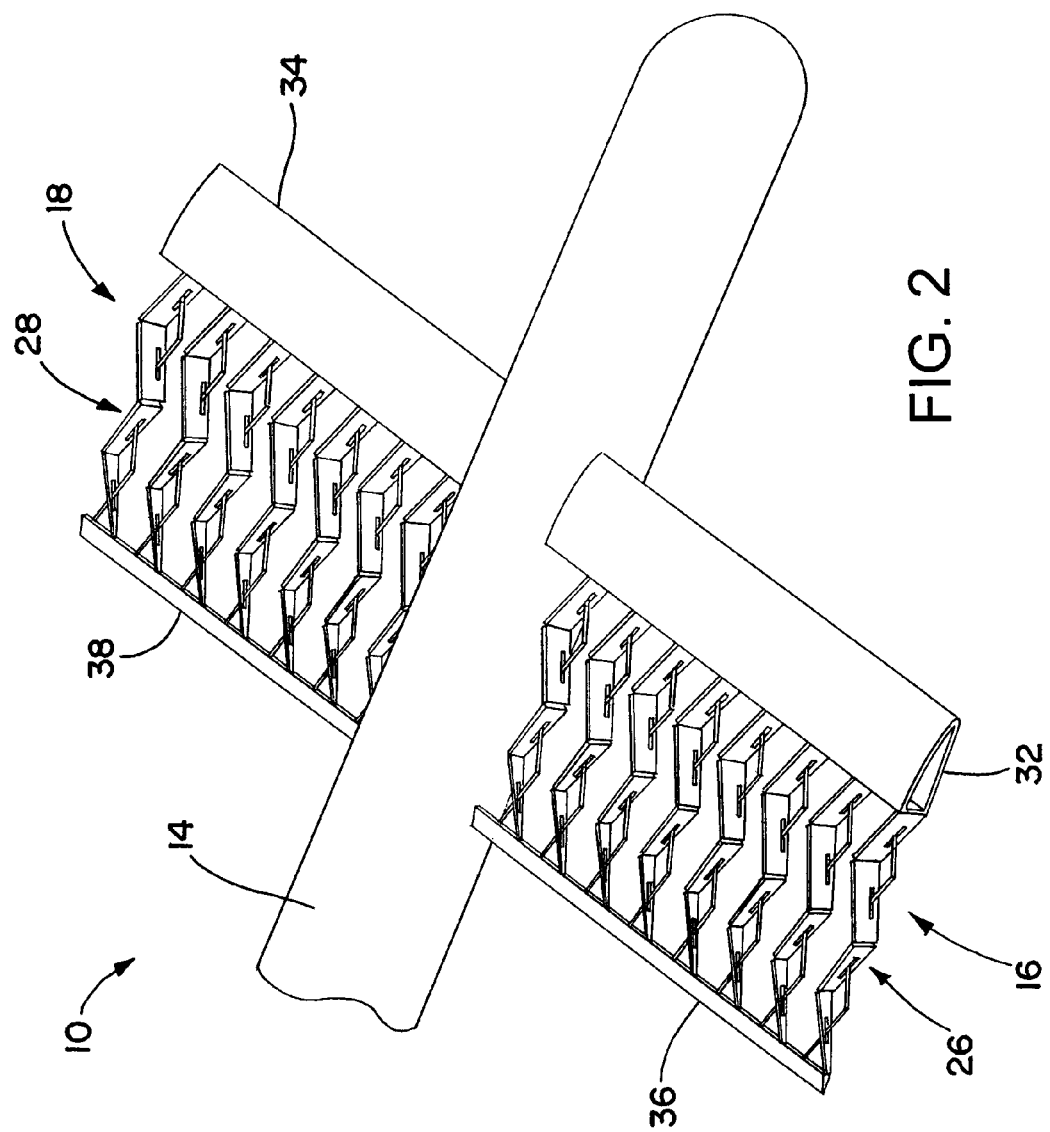
FIG. 2 is another oblique view of part of the air vehicle of FIG. 1A, with wings partially deployed.

Referring initially to FIGS. 1A, 1B, and 2, an air vehicle 10 is deployed from a container 12. FIGS. 1A and 1B shows the air vehicle 10 in its stowed state or condition, within the container 12, and FIG. 2 shows the air vehicle 10 in its deployed state or condition. The air vehicle 10 may be powered or unpowered. The air vehicle 10 may be a missile, a glide bomb, an unmanned aerial vehicle, or other types of air vehicles.

The air vehicle 10 includes a fuselage 14, wings 16 and 18, and may include fins, canards, or other surfaces (not shown). In the stowed condition, the wings 16 and 18 are folded back against the fuselage 14. The wings 16 and 18 deploy by rotating about connections to the fuselage 14, and extending deployable chord structures 26 and 28, to increase the chords of the wings 16 and 18. For clarity a skin structure of the wings 16 and 18 is omitted from the illustrated embodiments shown in FIGS. 1A-7. The skins may be made of a suitable fabric or other material. In increasing the chords of the wings 16 and 18, leading-edge spars 32 and 34 remain in place, while trailing-edge spars 36 and 38 move rearward.

The rotation of the wings 16 and 18 to the orientation shown in FIG. 2 may be accomplished by suitable mechanisms. Examples of deployment mechanisms for accomplishing the desired change in orientation are shown in co-owned U.S. Pat. Nos. 6,905,093 and 7,642,492, the descriptions and figures of which are incorporated by reference herein. Further details regarding such deployment mechanisms for changing orientation are omitted from further discussion.

Once the wings 16 and 18 have rotated into the orientation shown in FIG. 2, the wings 16 and 18 may be locked into place. Protrusions on the inboard edges of the wings 16 and 18 are received in suitable recesses in the fuselage 14. Suitable mechanical or other locks may be used to hold the wings 16 and 18 in the deployed orientation shown in FIG. 2. To give one example, spring-loaded pins in the fuselage 14 may engage suitable holes or recesses in the protrusions. It will be appreciated that a variety of other locking mechanisms may be used instead.

In addition the wings 16 and 18 may be configured to lock into place once their chords are fully expanded. This may be done in any of a variety of suitable ways. To give one example, the inner edges of the trailing-edge spars 36 and 38 may engage suitable detents, recesses, or other mechanisms, to hold the wings 16 and 18 in the chord-expanded condition of the deployed state.

Fins or other surfaces may be hingedly coupled to the fuselage 14, and may rotate between the stowed configuration shown in FIGS. 1A and 1B, and the deployed configuration shown in FIG. 2. Spring forces may be used to accomplish the deployment of the fins or other surfaces automatically when the air vehicle leaves the container 12. Any of a variety of suitable locks may be used to hold the fins or other surfaces in place once they are deployed.

Flight of the air vehicle 10 may be controlled by any of a variety of means or mechanisms. The air vehicle 10 may have any of a variety of control surfaces, such as fins, rudder, ailerons, and/or canards (not shown), which may be used to steer the air vehicle 10 on a desired course or to a desired location. Systems for controlling steering of air vehicles are known.

Figure 3:
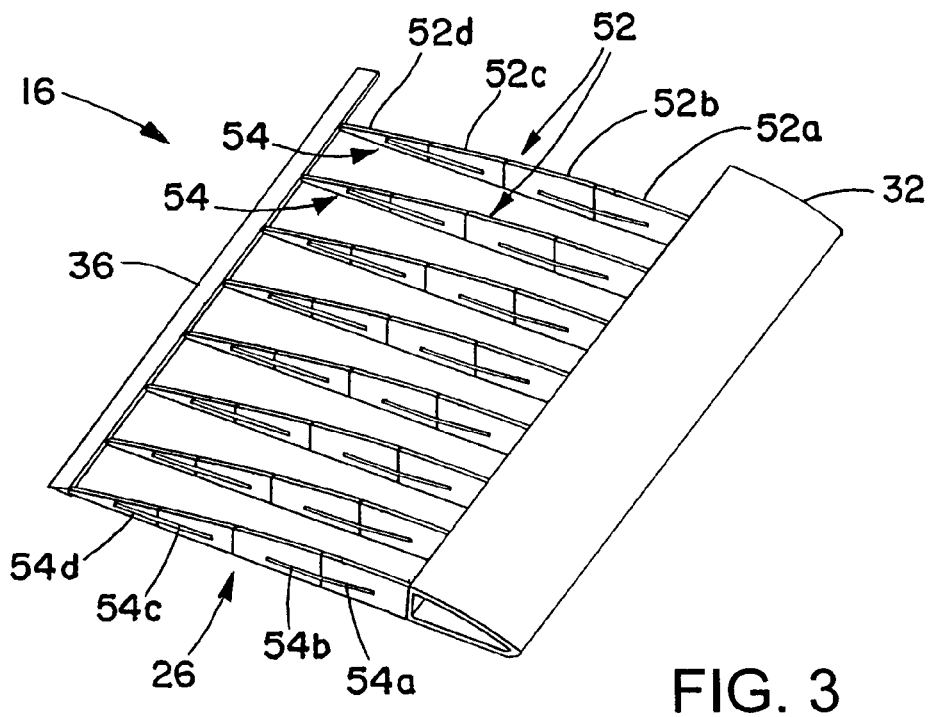
FIG. 3 is an oblique view of a fully-deployed wing of the air vehicle of FIG. 1A.
Figure 4:
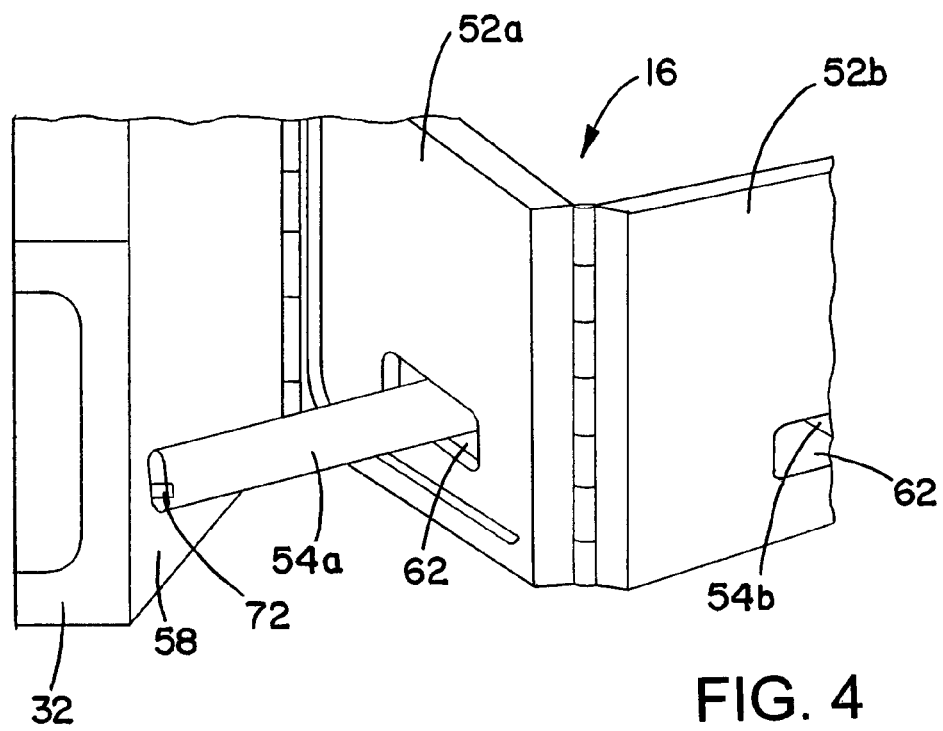
FIG. 4 is a fragmentary view of parts of the wing of the air vehicle of FIG. 1A.

Turning now to FIGS. 3 and 4, further details are given regarding the structure of the wings 16 and 18. The wing 16 is shown in the figures, but it will be appreciated that the wing 18 has similar structures. The wing 16 has a hollow leading-edge spar 32, which has a D shape in cross section. The leading-edge spar 32 may be made of any of a variety of suitable materials, such as aluminum or composite materials, such as carbon composite/fiber-reinforced plastic. The trailing-edge spar 36 may be made of similar materials.

The extendible chord structure 26 between the spars 32 and 36 consists of a series of foldable ribs 52, each with a corresponding extension linkage 54. Each of the ribs 52 includes multiple rib segments 54a-54d that are hingedly coupled to one another, or otherwise able to fold over one another. The rib segments 54a-54d for each of the ribs 52 include a forward rib segment 52a that is hingedly coupled to a back surface 58 of the leading-edge spar 32, and an aft rib segment 52d that is hingedly coupled to the trailing-edge spar 36. Intermediate rib segments 52b and 52c are located between the rib segments 52a and 52d.

The extension linkages 54 each include multiple extension linkage segments 54a-54d. The forward extension linkage segment 54a is slidingly coupled to the leading-edge spar back surface 58. The aft extension linkage segments 54d is close to the trailing-edge spar 36, but is not necessarily directly mechanically coupled to the trailing-edge spar 36. Intermediate extension linkage segments 54b and 54c are between the extension linkage segments 54a and 54d. The extension linkage segments 54a-54d are hingedly coupled to one another.

The extension linkage segments 54a-54d are also mechanically coupled to their respective counterpart rib segments 52a-52d. The extension linkage segments 54a-54d pass through a series of openings 62 in the rib segments 52a-52d. In the illustrated embodiment the openings 62 are holes, but alternatively the openings 62 may be notches in the rib segments 52a-52d. There are pin joints between the extension linkage segments 54a-54d and the corresponding rib segments 52a-52d. This maintains the centers of the rib segments 52a-52d at the same locations as the centers of the extension linkage segments 54a-54d.

The ribs 52 may be extended by extending the extension linkages 54. For each of the extension linkages 54, the forward extension linkage segment 54a has a slider 72. The sliders 72 can be moved along the back surface 58 to extend the ribs 52 and the extension linkages 54. The sliders 72 may be linked to a mechanism, for example within the leading-edge spar 32, for moving the sliders 72, and thus for extending or retracting the extension linkages 54 and the ribs 52. The mechanism for moving the sliders 72 (and for extending the ribs 52) may be any of a wide variety of force producing mechanisms. To give one example, a screw drive coupled to a motor could be used to move the sliders 72. As another alternative, springs could be used as the motive force to move the sliders 72 and expand the ribs 52. As a further alternative, air bags could be inflated at one or more locations within the wing 16, such as by use of suitable pyrotechnic or other pressurized-gas-producing devices, in order cause the ribs 52 to expand. Air bag(s) may serve as a locking mechanism, preventing retraction of the wing 16 once its chord is extended. Alternative locks include mechanical locks, such as spring-loaded latches.

FIG. 5-7 show steps in the extension process. FIG. 5 shows the wing 16 in its most compact (stowed) configuration. FIG. 6 shows a first step in the chord extension process, with the sliders 72 (FIG. 4) moving toward where the ribs 52 are coupled to the leading-edge spar 32. FIG. 7 shows the wing 16 mostly extended, with full extension resulting in the configuration shown in FIG. 3.

The illustrated embodiment has six ribs 52 and six extension linkages 54. Each of the ribs 52 has four rib segments 52a-52d, and each of the extension linkages 54 has four extension linkage segments 54a-54d. It will be appreciated that these numbers may vary for other embodiments. The ribs 52 and/or the extension linkages 54 may be made of the same material as the spars 32 and 36.

Figure 8:
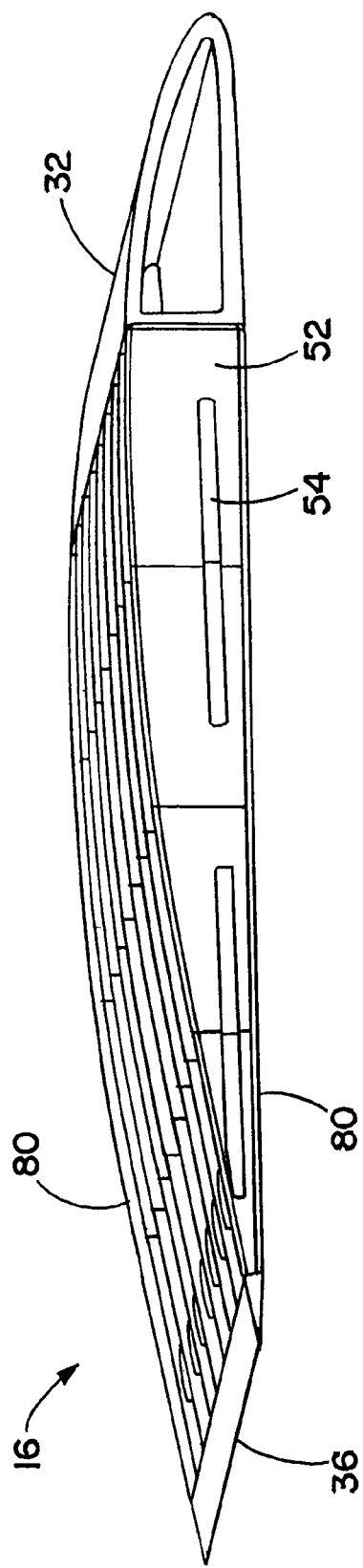
FIG. 8 is an oblique view of an extendible wing in accordance with another embodiment of the invention.

FIG. 8 shows the wing 16 with a skin 80 over the ribs 52, supported by the ribs 52. The skin 80 may be made of fabric or another suitable flexible material. The skin 80 may cover the entire outer surface of the wing 16. Alternatively, the skin 80 may be attached to either or both of the spars 32 and 36, and may cover only a portion of the wing 16 that includes the ribs 52. The skin 80 may be folded up when the wing 16 is in the stowed configuration, with the skin 80 becoming unfolded and form fitting as the chord of the wing 16 is extended.

The wings 16 and 18 may increase chord by a factor of at least 2, by a factor of at least 2.5, or by a factor of at least 3. The wings 16 and 18 may have a flat-bottomed airfoil shape, as opposed to a cambered airfoil shape, since a flat-bottomed airfoil shape is easier to conform the skin 80 to a flat-bottomed airfoil shape, such as a Clark Y airfoil shape.

The wings and air vehicles described herein advantageously produce a wing structure that can be very compact when stowed, yet still are able to provide the ability to withstand high stresses. As stated above, the wings may be expandable by a factor of three in their chord (and in wing surface area), but the wings are still able to withstand considerable stresses, for example being able to carry 6 g's in stress.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An extendible-chord air vehicle wing comprising:
    a leading-edge spar;
    foldable ribs pivotally coupled to a back of the leading-edge spar;
    foldable extension linkages slidingly coupled to the leading-edge spar; and
    a trailing-edge spar disposed opposite the leading-edge spar and pivotally coupled to the foldable ribs;
    wherein each extension linkage has a proximal end slidingly coupled to the leading-edge spar and a distal end opposite the proximal end; and
    wherein each distal end is free floating with respect to the trailing-edge spar.

2. The air vehicle wing of claim 1, wherein the leading-edge spar is a D-shape spar.

3. The air vehicle wing of claim 1, further comprising a skin on an outside surface, covering the ribs.

4. The air vehicle wing of claim 1, wherein the wing has a flat-bottomed, uncambered airfoil shape.

5. The air vehicle wing of claim 1,
    wherein the ribs and the extension linkages are foldable and unfoldable relative to one another for causing at least one of the leading-edge spar or the trailing-edge spar to move relative to the other of the leading-edge spar or the trailing-edge spar.

6. The air vehicle wing of claim 1, in combination with an air vehicle fuselage, wherein the leading-edge spar is pivotally coupled to the fuselage.

7. The air vehicle wing of claim 1, wherein each of the ribs includes multiple rib segments hingedly coupled together.

8. The air vehicle wing of claim 7, wherein the extension linkages each include multiple extension linkage segments hingedly coupled together.

9. The air vehicle wing of claim 8, wherein, for each of the extension linkages, the linkage segments pass through respective openings in the rib segments.

10. The air vehicle wing of claim 9, wherein the openings are notches.

11. The air vehicle wing of claim 9, wherein the openings are holes.

12. The air vehicle wing of claim 1, wherein each rib is pivotally coupled to a respective extension linkage.

13. The air vehicle wing of claim 12, wherein each extension linkage extends through openings in a respective rib.

14. An extendible-chord air vehicle wing comprising:
    a leading-edge spar;
    a trailing-edge spar;
    foldable ribs pivotally coupled to the leading-edge spar and pivotally coupled to the trailing-edge spar; and
    foldable extension linkages each having a proximal end coupled to the leading-edge spar and a distal end opposite the proximal end, wherein the distal end of each extension linkage is free floating with respect to the trailing-edge spar.

15. The air vehicle wing of claim 14, wherein each extension linkage is slidingly coupled to the leading-edge spar.

* * * * *